United States Patent
Xu et al.

(10) Patent No.: US 9,125,118 B2
(45) Date of Patent: Sep. 1, 2015

(54) METHOD AND APPARATUS FOR PERFORMING ACCESS CONTROL IN WIRELESS COMMUNICATION SYSTEM

(75) Inventors: Jian Xu, Gyeonggi-do (KR); Gene Beck Hahn, Gyeonggi-do (KR); Sung Hoon Jung, Gyeonggi-do (KR); Young Dae Lee, Gyeonggi-do (KR); Seung June Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/990,806

(22) PCT Filed: Dec. 2, 2011

(86) PCT No.: PCT/KR2011/009306
§ 371 (c)(1),
(2), (4) Date: May 31, 2013

(87) PCT Pub. No.: WO2012/074325
PCT Pub. Date: Jun. 7, 2012

(65) Prior Publication Data
US 2013/0250917 A1    Sep. 26, 2013

Related U.S. Application Data

(60) Provisional application No. 61/419,767, filed on Dec. 3, 2010, provisional application No. 61/505,503, filed on Jul. 7, 2011.

(51) Int. Cl.
*H04W 36/08* (2009.01)
*H04W 48/02* (2009.01)
*H04W 8/18* (2009.01)
*H04W 92/20* (2009.01)

(52) U.S. Cl.
CPC .............. *H04W 36/08* (2013.01); *H04W 48/02* (2013.01); *H04W 8/186* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2010/0039987 A1 | 2/2010 | Hegde et al. | |
| 2010/0130215 A1* | 5/2010 | Jung et al. | 455/450 |
| 2010/0169412 A1 | 7/2010 | Gupta | |
| 2010/0202410 A1 | 8/2010 | Watanabe et al. | |
| 2010/0216473 A1 | 8/2010 | Kazmi et al. | |
| 2010/0279687 A1* | 11/2010 | Horn et al. | 455/435.1 |
| 2010/0309782 A1* | 12/2010 | Lee et al. | 370/229 |
| 2011/0142004 A1* | 6/2011 | Bae et al. | 370/331 |
| 2011/0151920 A1* | 6/2011 | Oh et al. | 455/525 |
| 2011/0171924 A1* | 7/2011 | Faccin et al. | 455/404.1 |

(Continued)

OTHER PUBLICATIONS

Search Report issued in corresponding International Patent Application No. PCT/KR2011/009306 dated Jul. 31, 2012.

*Primary Examiner* — Ayaz Sheikh
*Assistant Examiner* — Peter Chau
(74) *Attorney, Agent, or Firm* — Morgan, Lewis & Bockius LLP

(57) ABSTRACT

A method and apparatus of performing access control in a wireless communication system is provided. A first home eNodeB (eNB) determines whether an X2 interface between the first HeNB and a second HeNB is available or not for an X2 handover based on a cell access mode of the second HeNB. Or, a first macro eNB determines whether an X2 interface between the first macro eNB and a second HeNB is available or not for an X2 handover based on a cell access mode of the second HeNB. Or, access control is performed by a home eNB gateway (GW).

6 Claims, 17 Drawing Sheets

(56) References Cited

U.S. PATENT DOCUMENTS

| | | | |
|---|---|---|---|
| 2011/0269464 A1* | 11/2011 | Xu et al. | 455/436 |
| 2011/0269465 A1* | 11/2011 | Xu et al. | 455/436 |
| 2012/0002637 A1* | 1/2012 | Adjakple et al. | 370/331 |
| 2012/0100852 A1* | 4/2012 | Horn | 455/436 |
| 2012/0142355 A1* | 6/2012 | Jha | 455/436 |
| 2012/0258768 A1* | 10/2012 | Takahashi et al. | 455/525 |
| 2014/0187244 A1* | 7/2014 | Masini et al. | 455/436 |
| 2014/0248881 A1* | 9/2014 | Xu et al. | 455/436 |

* cited by examiner (a)

(b)

METHOD AND APPARATUS FOR PERFORMING ACCESS CONTROL IN WIRELESS COMMUNICATION SYSTEM

TECHNICAL FIELD

The present invention relates to wireless communication, and more particularly, to a method and apparatus for performing access control in wireless communication system.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (CPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS security control, Inter CN node signaling for mobility between 3GPP access networks, Idle mode UE reachability (including control and execution of paging retransmission), tracking area list management (for UE in idle and active mode), PDN GW and serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including per-user based packet filtering (by e.g. deep packet inspection), lawful interception, UE IP address allocation, transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, system architecture evolution (SAE) bearer control, and ciphering and integrity protection of non-access stratum (NAS) signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(*a*), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(*b*), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, radio bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel (PDCCH). PDCCHs carry dynamic allocated resources, such as PRBs and MCS.

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. The HeNB is a small base station designed for use in residential or small business environment. The HeNB may be a femto cell or a pico cell. The HeNB is short range about tens of meter, installed by the consumer for better indoor voice and data reception.

FIG. 5 shows logical architecture of an E-UTRAN HeNB. It may be referred to Paragraph 4.6.1 of "Technical Specification Group Radio Access Network; Evolved Universal Terrestrial Radio Access (E-UTRA); and Evolved Universal Terrestrial Radio Access Network (E-UTRAN); Overall description; Stage 2 (release 9)" to 3GPP (3rd generation partnership project) TS 36.300 V9.4.0 (2010 June).

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

A closed subscriber group (CSG) identifies subscribers of an operator who are permitted to access one or more cells but which have restricted access (CSG cells). A CSG cell broadcasts a CSG indicator set to true and a specific CSG identity. A HeNB may be a CSG cell. The CSG cell operates with an open mode or a closed mode. When the CSG cell operates with an open mode, the HeNB operates as a normal eNB. When the CSG cell operates with a closed mode, the HeNB provides services only to its associated CSG members. That is, the HeNB may perform access control which is a process that checks whether a UE is allowed to access and to be granted services in a CSG cell. A CSG whitelist is a list stored in a UE containing the CSG identities of the CSG cells to which the subscriber belongs.

A hybrid cell is a cell broadcasting a CSG indicator set to false and a specific CSG identity. This cell is accessible as a CSG cell by UEs which are members of the CSG cell and as a normal cell by all other UEs. The hybrid cell may check whether a UE is a member or non-member of the hybrid cell. This process may be referred as a membership verification. The UEs which are members of the CSG cell may have a higher priority than other UEs to access to the hybrid cell. The hybrid cell may be referred as a CSG cell which operates with a hybrid mode.

FIG. 6 shows overall architecture with deployed HeNB GW.

Referring to FIG. 6, an E-UTRAN may include one or more eNB 60, one or more HeNB 70 and a HeNB GW 79. One or more E-UTRAN MME/S-GW 69 may be positioned at the end of the network and connected to an external network. The one or more eNB 60 may be connected to each other through the X2 interface. The one or more eNB 60 may be connected to the MME/S-GW 69 through the S1 interface. The HeNB GW 79 may be connected to the MME/S-GW 69 through the S1 interface. The one or more HeNB 70 may be connected to the HeNB GW 79 through the S1 interface or may be connected to the MME/S-GW 69 through the S1 interface. The one or more HeNB 70 may not be connected to each other.

Based on the structure in FIG. 6, if a user equipment (UE) served currently by HeNB or eNB requests handover to another HeNB, the path will go through the core network. That is, the handover should be performed through the S1 interface. This handover procedure can be big signaling impact on the core network, which has to deal with a lot of processing. In addition, a handover delay can be occurred as the handover is performed through the core network, which may be sensitive to UE in a certain situation.

FIG. 7 shows another overall architecture with deployed HeNB GW.

Referring to FIG. 7, an E-UTRAN may include one or more eNB 80, one or more HeNB 90 and a HeNB GW 99. One or more E-UTRAN MME/S-GW 89 may be positioned at the end of the network and connected to an external network. The one or more eNB 80 may be connected to each other through the X2 interface. The one or more eNB 80 may be connected to the MME/S-GW 89 through the S1 interface. The HeNB GW 99 may be connected to the MME/S-GW 89 through the S1 interface. The one or more HeNB 90 may be connected to the HeNB GW 99 through the S1 interface or may be connected to the MME/S-GW 89 through the S1 interface. The HeNBs 90 may be connected to each other through the X2 interface.

In this case, the HeNBs connected to each other through the X2 interface should have same CSG identifiers (IDs) or the target HeNB should operate with the open mode. In other words, only the HeNBs with the same CSG IDs or the target HeNB which operate with the open mode can have the direct X2 interface even if some HeNB may support the hybrid mode, which can be access by any UEs. If the conditions are satisfied, a handover may be performed through the direct X2 interface between HeNBs.

However, the signaling impact problem on the core network and the handover delay problem may still exist due to the implementation limitations. Also, if the CSG IDs are different for the source HeNB and the target HeNB or the source (H)eNB operates with the open mode and the target HeNB operates with the hybrid mode or the closed mode, a handover through the S1 interface has to be used.

According to the problem as described above, another interface is required when a handover is performed from the source HeNB to the target HeNB in case that the source HeNB and the target HeNB have different CSG IDs or in case that the source (H)eNB operates with the open mode and the target HeNB operates with the hybrid mode or the closed mode. Also, a method of performing access control for HeNB mobility enhancement is required.

SUMMARY OF INVENTION

Technical Problem

The present invention provides a method and apparatus for performing access control in wireless communication system. The present invention provides a method of access control for HeNB mobility enhancement when a target HeNB supports CSG whether a source eNB is a macro eNB or a HeNB.

Technical Solution

In an aspect, a method of performing access control by a first home evolved NodeB (HeNB) in a wireless communication system is provided. The method includes determining whether an X2 interface between the first HeNB and a second HeNB is available or not for an X2 handover based on a cell access mode of the second HeNB, wherein the first HeNB and the second HeNB operate with one of an open mode, a hybrid mode and a closed mode, the open mode indicating that a HeNB provides services to any user equipments (UEs), the hybrid mode indicating that a closed subscriber group (CSG) cell provides services to its associated CSG member UEs and to non-CSG member UEs, the closed mode indicating that a CSG cell provides services only to its associated CSG member UEs, and wherein the first HeNB and the second HeNB have different closed subscriber group (CSG) identifiers (IDs) or the first HeNB operates with the open mode and the second HeNB operates with the hybrid mode or the closed mode.

The X2 interface between the first HeNB and the second HeNB may be available for the X2 handover if the cell access mode of the second HeNB is the open mode or the hybrid mode.

The X2 interface between the first HeNB and the second HeNB may be available for the X2 handover, if the cell access mode of the second HeNB is the closed mode and a UE is a member of the second HeNB, the UE intending to handover to the second HeNB.

The method may further include transmitting an X2 setup request message to the second HeNB, the X2 setup request message including a cell access mode indicator indicating the cell access mode of the first HeNB.

The method may further include receiving an X2 setup response message from the second HeNB, the X2 setup response message including a cell access mode indicator indicating the cell access mode of the second HeNB.

The method may further include comprising performing UE access control, wherein the performing UE access control includes verifying membership information of a UE.

The method may further include receiving stored CSG subscription information for a UE from a network.

In another aspect, a method of performing access control by a first macro evolved NodeB (eNB) in a wireless communication system is provided. The method includes determining whether an X2 interface between the first macro eNB and a second HeNB is available or not for an X2 handover based on a cell access mode of the second HeNB, wherein the second HeNB operate with one of an open mode, a hybrid mode and a closed mode, the open mode indicating that a HeNB provides services to any user equipments (UEs), the hybrid mode indicating that a closed subscriber group (CSG) cell provides services to its associated CSG member UEs and to non-CSG member UEs, the closed mode indicating that a CSG cell provides services only to its associated CSG member UEs, and wherein the second HeNB operates with the hybrid mode or the closed mode.

The X2 interface between the first macro eNB and the second HeNB may be available for the X2 handover if the cell access mode of the second HeNB is the open mode or the hybrid mode.

The X2 interface between the first macro eNB and the second HeNB may be available for the X2 handover, if the cell access mode of the second HeNB is the closed mode and a UE is a member of the second HeNB, the UE intending to handover to the second HeNB.

The method may further include receiving an X2 setup response message from the second HeNB, the X2 setup response message including a cell access mode indicator indicating the cell access mode of the second HeNB.

The method may further include comprising performing UE access control, wherein the performing UE access control includes verifying membership information of a UE.

The method may further include receiving stored CSG subscription information for a UE from a network.

In another aspect, a method of performing access control by a home evolved NodeB (HeNB) gateway (GW) in a wireless communication system is provided. The method includes receiving a cell access mode of the second HeNB and membership information of a user equipment (UE), determining whether an X2 interface between the a first eNB and the second HeNB is available or not for an X2 handover based on the cell access mode of the second HeNB, and performing UE access control.

The X2 interface between the first eNB and the second HeNB may be available for the X2 handover if the cell access mode of the second HeNB is the open mode or the hybrid mode.

The X2 interface between the first eNB and the second HeNB may be available for the X2 handover, if the cell access mode of the second HeNB is the closed mode and the UE is a member of the second HeNB, the UE intending to handover to the second HeNB.

The X2 interface between the first eNB and the second HeNB may be direct or indirect.

The performing UE access control may include verifying the received membership information of the UE.

The method may further include receiving stored CSG subscription information for the UE from a network.

The first eNB may be one of a macro eNB or a HeNB.

Advantageous Effects

A user equipment (UE) served currently by HeNB or eNB can perform a handover efficiently to another HeNB.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
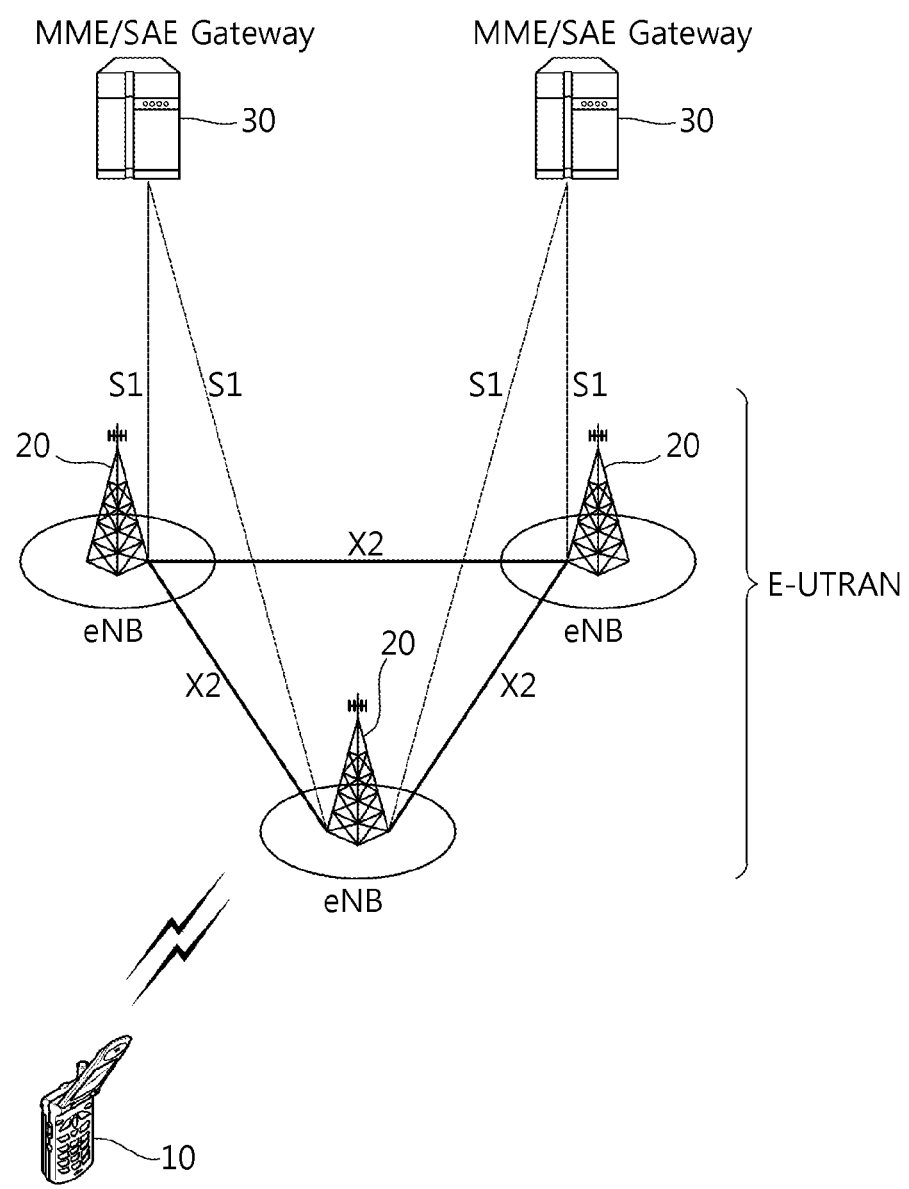
FIG. 1 shows network structure of an evolved universal mobile telecommunication system (E-UMTS).
Figure 2:
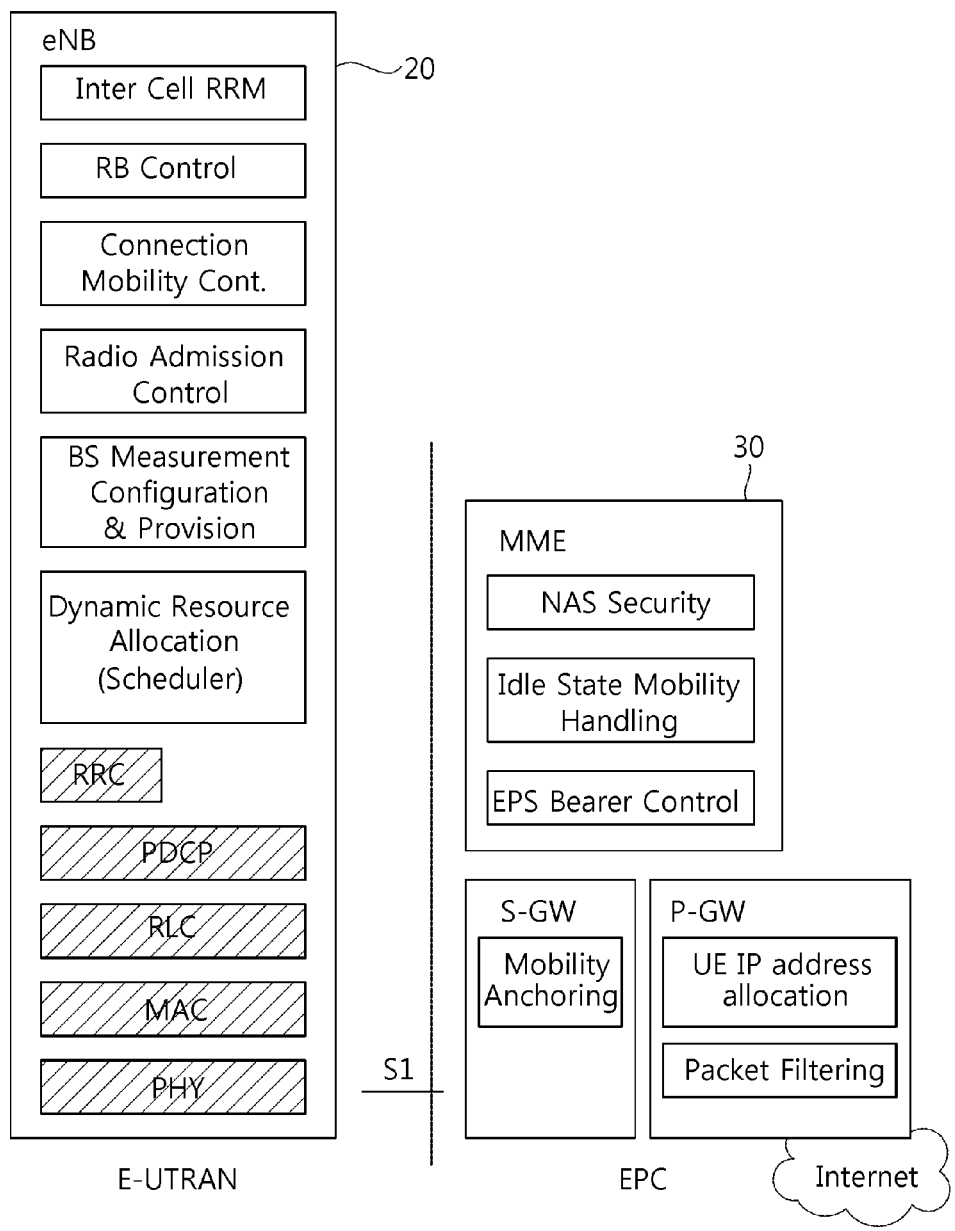
FIG. 2 shows architecture of a typical E-UTRAN and a typical EPC.
Figure 3:
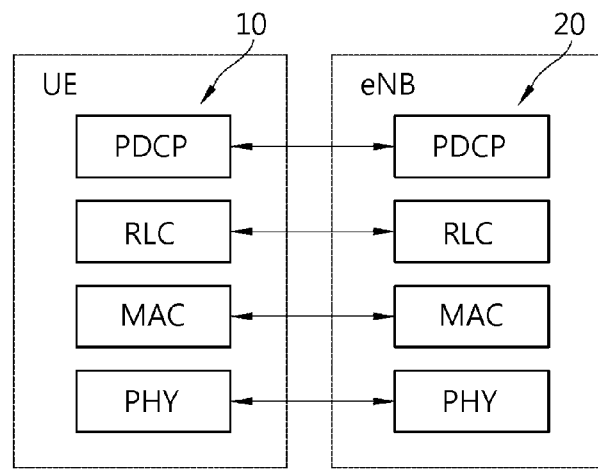
FIG. 3 shows a user-plane protocol and a control-plane protocol stack for the E-UMTS.
Figure 3:
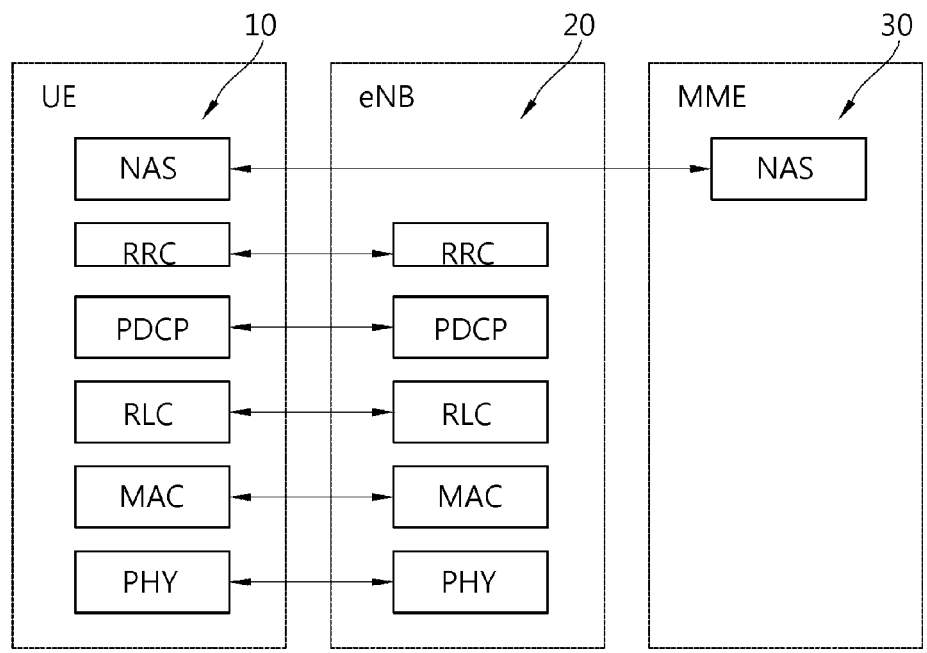
Figure 4:
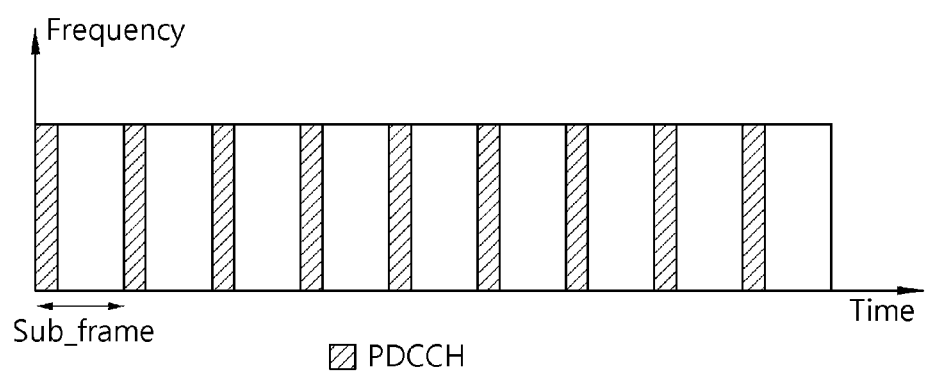
FIG. 4 shows an example of structure of a physical channel.
Figure 5:
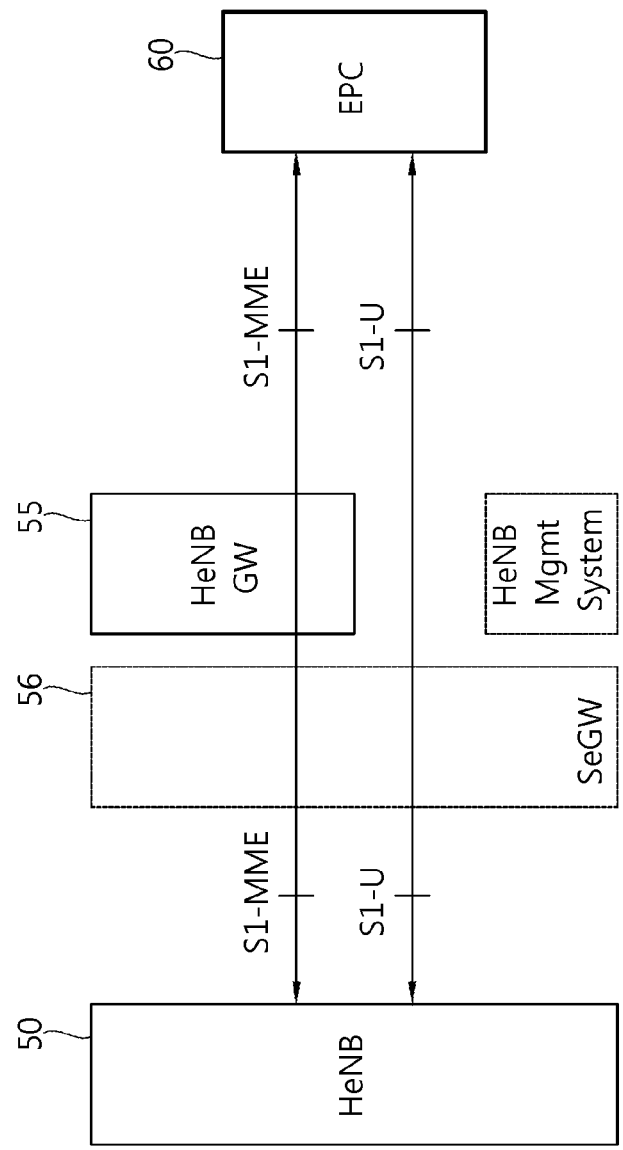
FIG. 5 shows logical architecture of an E-UTRAN HeNB.
Figure 6:
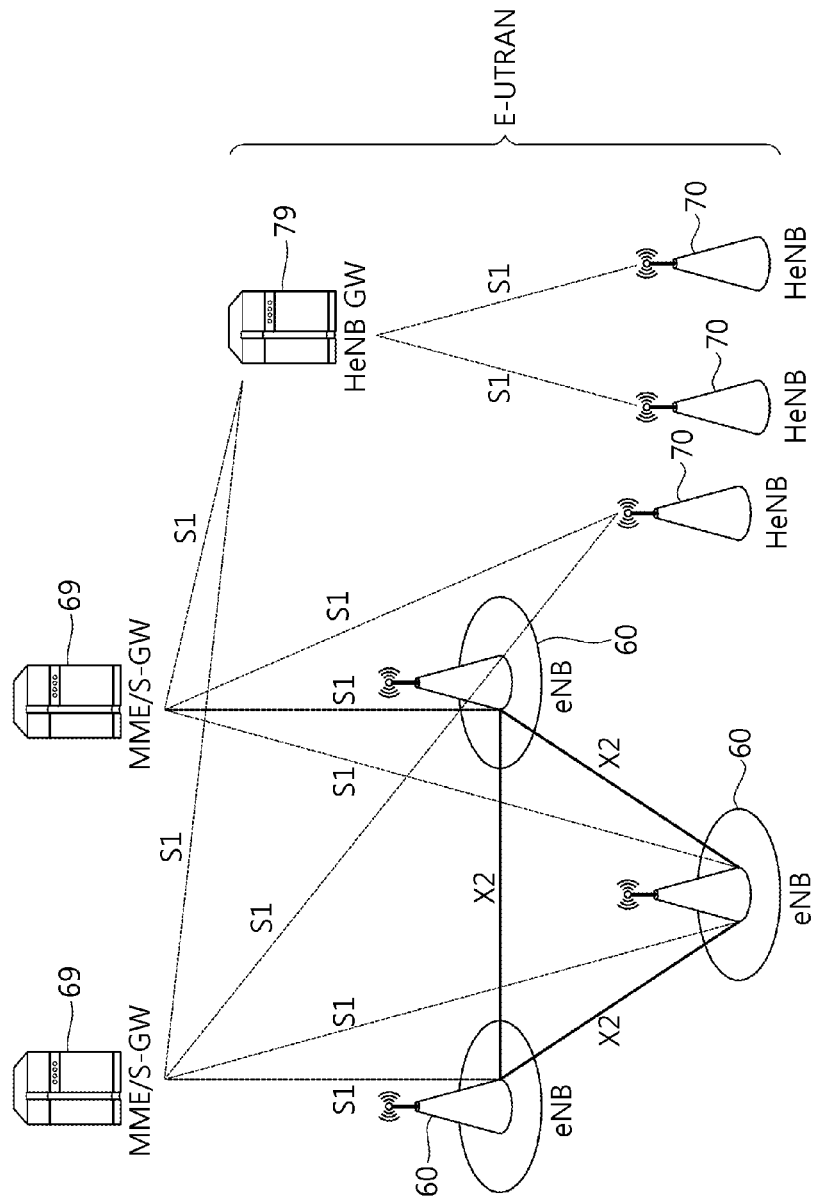
FIG. 6 shows overall architecture with deployed HeNB GW.
Figure 7:
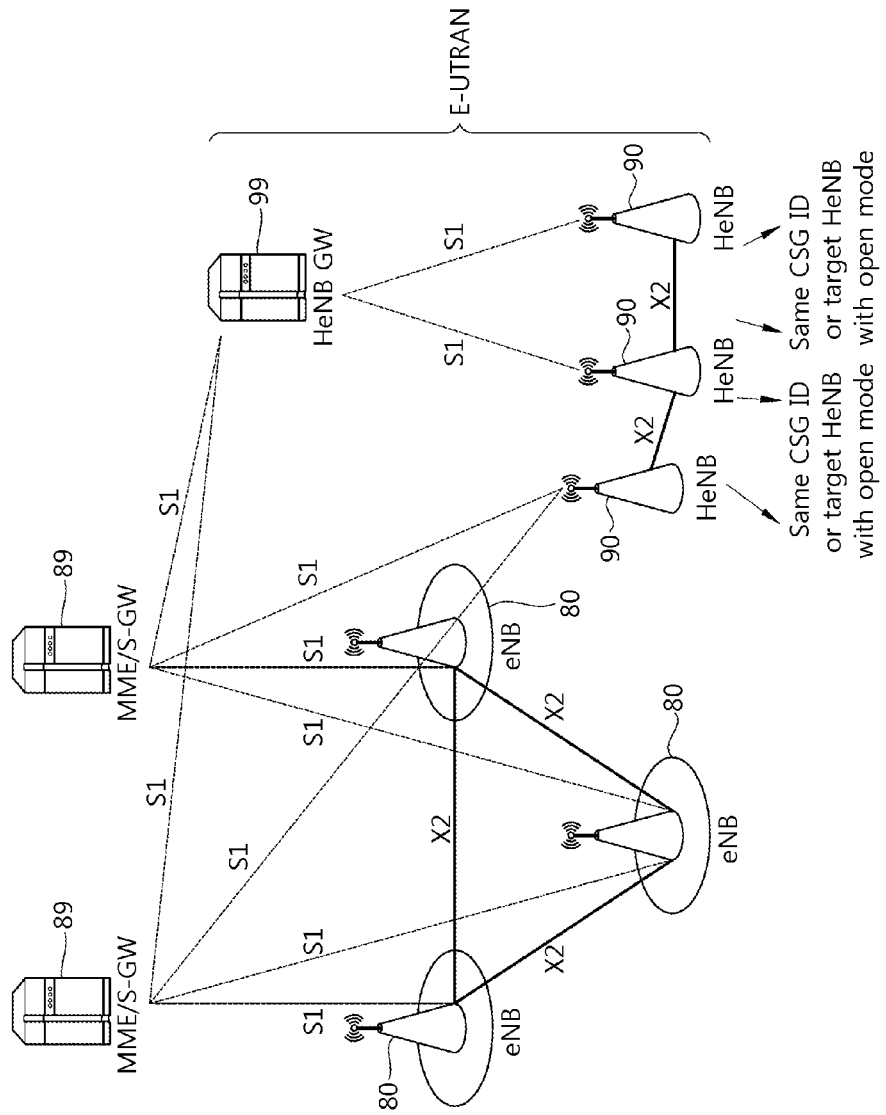
FIG. 7 shows another overall architecture with deployed HeNB GW.
Figure 8:
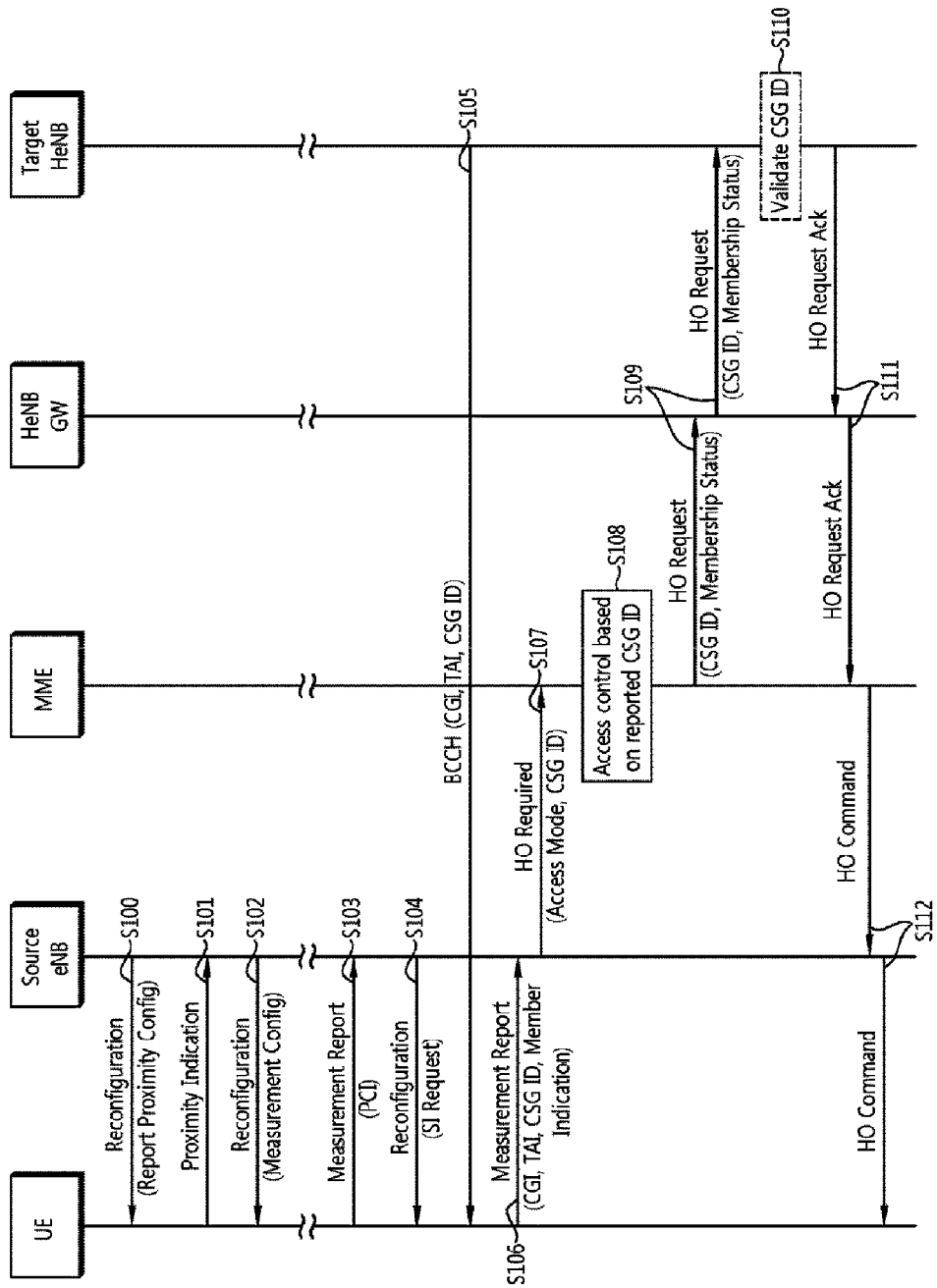
FIG. 8 shows an example of a handover procedure to the HeNB supporting CSG.

FIG. 8 shows an example of a handover procedure to the HeNB supporting CSG.

The handover procedure to the HeNB may be different from the normal handover procedure in that access control is performed. Access control is a function, by which if the target cell is a hybrid cell, prioritization of allocated resources may be performed based on the UE's membership status. Access control is done by a two step process, where first the UE reports the membership status based on the CSG ID received from the target cell and the UE's CSG whitelist, and then the network (MME) verifies the reported status.

In step S100, the source eNB configures the UE with proximity indication control.

In step S101, the UE sends an entering proximity indication when it determines it may be near a cell (based on autonomous search procedures) whose CSG ID is in the UE's CSG whitelist.

In step S102, if a measurement configuration is not present for the concerned frequency/radio access technology (RAT), the source eNB configures the UE with relevant measurement configuration including measurement gaps as needed, so that the UE can perform measurements on the reported RAT and frequency. The network may also use the proximity indication to minimize the requesting of handover preparation information of CSG/hybrid cells by avoiding requesting such information when the UE is not in the geographical area where cells whose CSG IDs are in the UE's CSG whitelist are located.

In step S103, the UE sends a measurement report including the physical cell identifier (PCI).

In step S104, the source eNB configures the UE to perform system information (SI) acquisition and reporting of a particular PCI.

In step S105, the UE performs SI acquisition from the target HeNB through a broadcast control channel (BCCH). The UE may acquire a cell global identity (CGI), a tracking area identity (TAI) and CSG ID of the target HeNB. The UE may suspend reception and transmission with the source eNB to acquire the relevant system information from the target HeNB.

In step S106, the UE sends a measurement report including the CGI, the TAI, the CSG ID and a member/non-member indication.

In step S107, the source eNB send a handover required message to the MME. The handover require message includes the CGI and the CSG ID of the target HeNB. If the target is a hybrid cell, a cell access mode of the target HeNB may be included.

In step S108, the MME performs UE access control to the CSG cell based on the CSG ID received in the handover required message and the stored CSG subscription data for the UE. If the access control procedure fails, the MME ends the handover procedure by replying with a handover preparation failure message. If the cell access mode is present in the handover required message, the MME determines the CSG membership status of the UE handing over to the hybrid cell and includes the CSG membership status in a handover request message.

In step S109, the MME sends the handover request message to the target HeNB including the target CSG ID received in the handover required message. If the target HeNB is a hybrid cell, the CSG membership status may be included in the handover request message.

In step S110, the target HeNB verifies that the CSG ID received in the handover request message matches the CSG ID broadcast in the target HeNB. If such validation is successful, it allocates appropriate resources. UE prioritization may also be applied if the CSG membership status indicates that the UE is a member of the target HeNB.

In step S111, the target HeNB sends a handover request acknowledge message to the MME via the HeNB GW if present.

In step S112, the MME sends a handover command message to the source eNB, and the source eNB transmits the handover command message to the UE.

According to the handover procedure to the HeNB, an access control may be performed.

Figure 9:
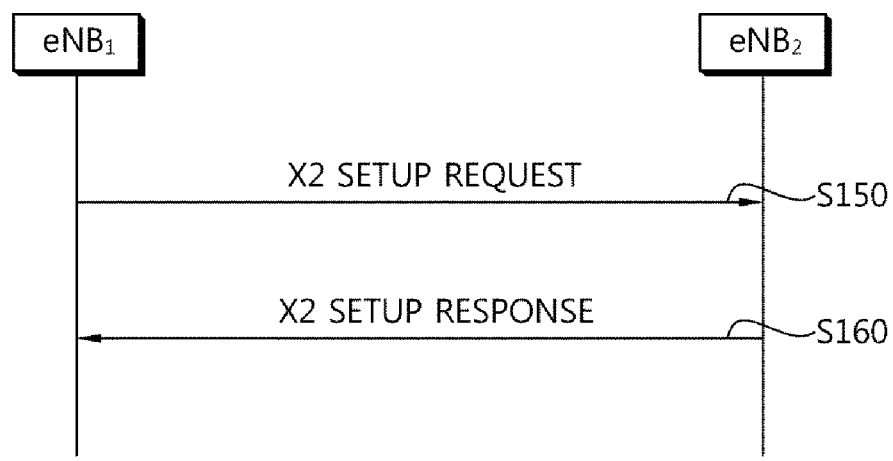
FIG. 9 shows a direct interface (X2) setup procedure between eNBs.

FIG. 9 shows a direct interface (X2) setup procedure between eNBs. The purpose of the X2 setup procedure is to exchange application level configuration data needed for two eNBs to interoperate correctly over the X2 interface.

In step S150, An eNB1 initiates the procedure by sending an X2 setup request message to an eNB2. In step S160, The eNB2 replies with an X2 setup response message. The eNB1 transfers a complete list of its served cells and, if available, a list of supported GU group IDs to the eNB2. The eNB2 replies with a complete list of its served cells and includes, if available, a list of supported GU group IDs in the reply.

A proposed method of performing access control method is described below. First, a method of performing access control by a source HeNB is described.

Figure 10:
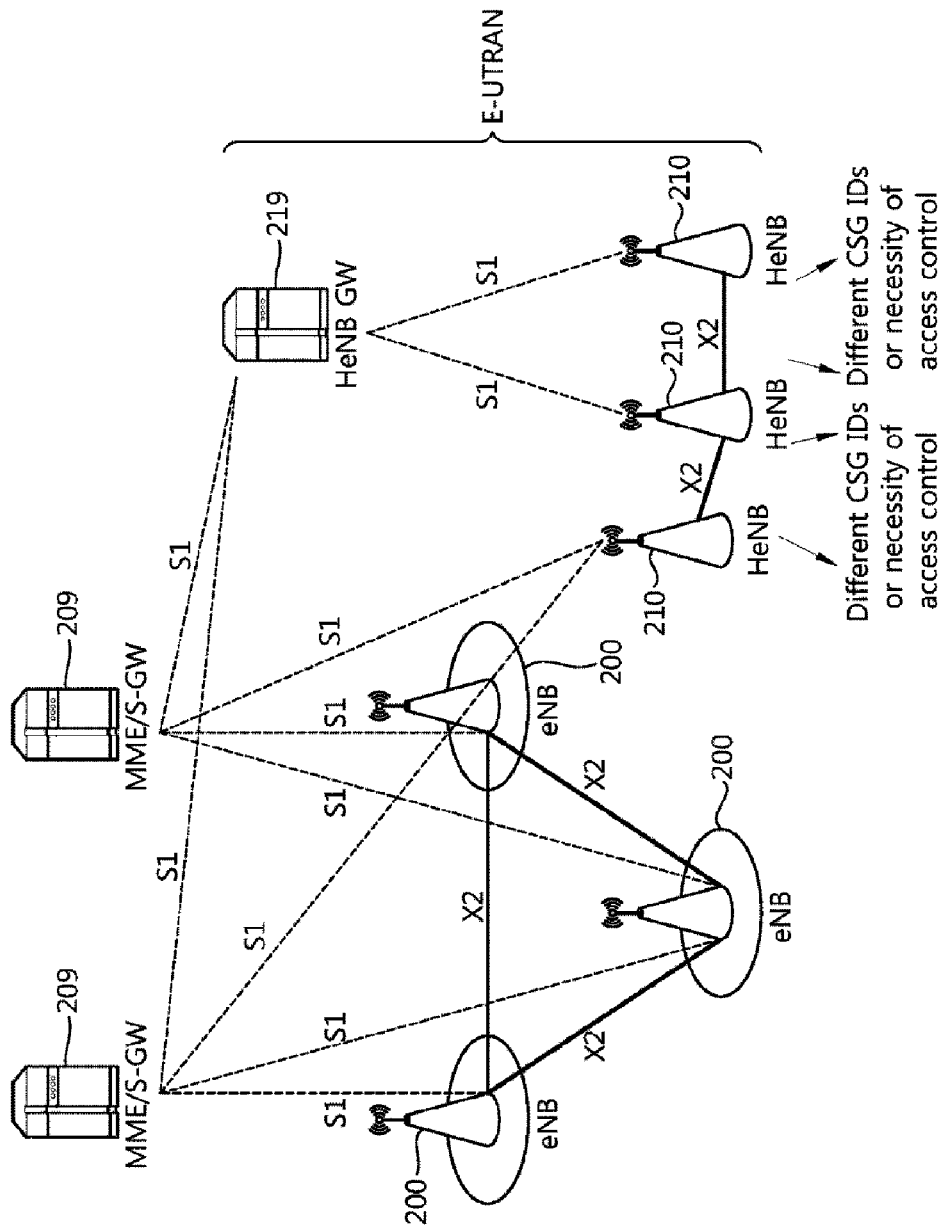
FIG. 10 shows overall architecture with deployed HeNB GW according to the proposed invention.

FIG. 10 shows overall architecture with deployed HeNB GW according to the proposed invention.

Referring to FIG. 10, an E-UTRAN may include one or more eNB 200, one or more HeNB 210 and a HeNB GW 219. One or more E-UTRAN MME/S-GW 209 may be positioned at the end of the network and connected to an external network. The one or more eNB 200 may be connected to each other through the X2 interface. The one or more eNB 200 may be connected to the MME/S-GW 209 through the S1 interface. The HeNB GW 219 may be connected to the MME/S-GW 209 through the S1 interface. The one or more HeNB 210 may be connected to the HeNB GW 219 through the S1 interface or may be connected to the MME/S-GW 209 through the S1 interface. The HeNBs 210 may be connected to each other through the X2 interface directly even if the HeNBs 210 have different CSG IDs. Or, the HeNBs 210 may be connected to each other through the X2 interface directly if a source HeNB operates with the open mode and a target HeNB operates with the hybrid mode or the closed mode when an X2 handover is performed between the source HeNB and the target HeNB. In this case, the source HeNB may be replaced with a macro eNB.

Figure 11:
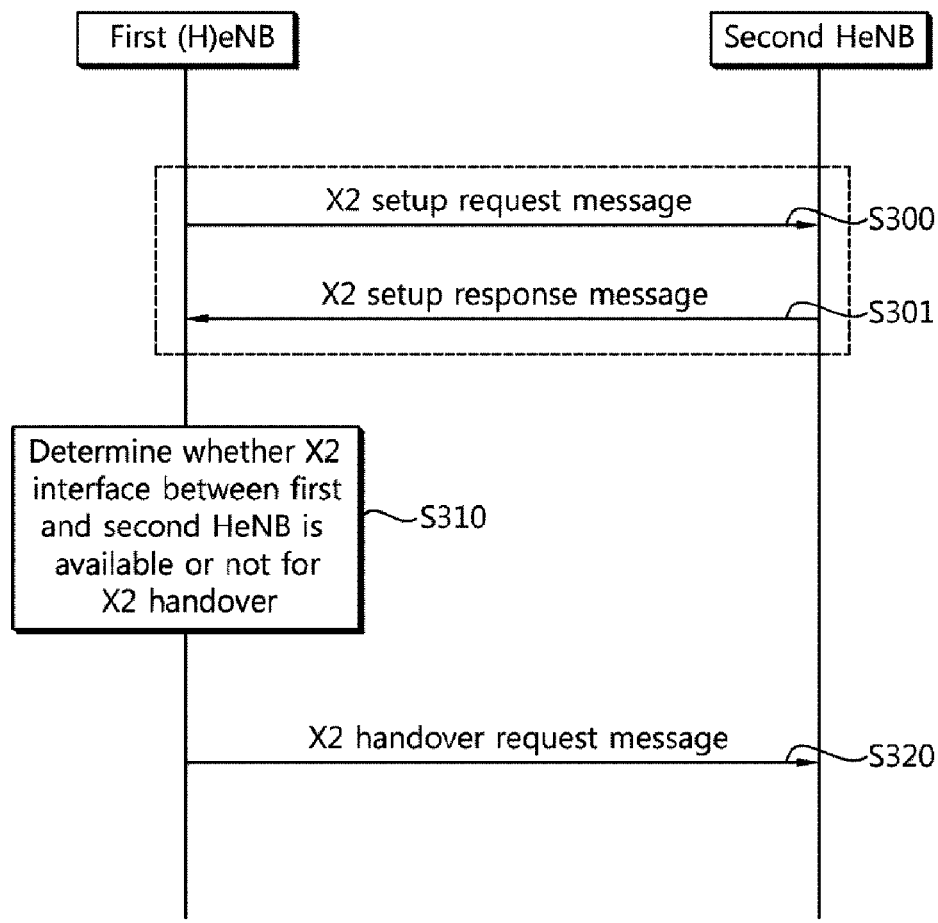
FIG. 11 shows the proposed access control method according to an embodiment of the present invention.

FIG. 11 shows the proposed access control method according to an embodiment of the present invention.

Referring to FIG. 11, a first eNB transmits an X2 setup request message to a second HeNB in step S300 or receives an X2 setup response message from the second HeNB in step S301. In case that the first eNB is a first HeNB, the first HeNB and the second HeNB operate with one of an open mode, a hybrid mode and a closed mode. Also, the first HeNB and the second HeNB have different CSG IDs. Or, the first HeNB operates with the open mode and the second HeNB operates with the hybrid mode or the closed mode. Or, in case that the first eNB is a first macro eNB, the second HeNB operates with the hybrid mode or the closed mode. In step S310, the first eNB determines whether an X2 interface between the first eNB and the second HeNB is available or not for an X2 handover based on a cell access mode of the second HeNB.

In step S300 or S301, the X2 setup request message or the X2 setup response message may include a cell access mode indicator which is indicating the cell access mode of the second HeNB.

The cell access mode indicator may be added in a served cell information IE in the X2 setup request message and X2 setup response message. The served cell information IE contains cell configuration information of a cell that a neighbor eNB may need for the X2 interface. Table 1 and table 2 below shows an example of the served cell information IE which adds the cell access mode indicator.

TABLE 1

| IE/Group Name | Presence | Range | IE type and reference | Semantics description | Criticality | Assigned Criticality |
|---|---|---|---|---|---|---|
| PCI | M | | INTEGER (0 ... 503, ...) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN Identity | M | | 9.2.4 | | — | — |
| ... | | | | | | |
| Number of Antenna Ports | O | | 9.2.43 | | YES | ignore |
| PRACH Configuration | O | | PRACH Configuration 9.2.50 | | YES | ignore |
| MBSFN Subframe Info | | 0 to maxnoofMBSFN | | MBSFN subframe configuration information defined in ref. [9] | GLOBAL | ignore |
| >Radioframe Allocation Period | M | | ENUMERATED (n1, n2, n4, n8, n16, n32, ...) | | — | — |
| >Radioframe Allocation Offset | M | | INTEGER (0 ... 7, ...) | | — | — |
| >Subframe Allocation | M | | 9.2.51 | | — | — |
| CSG ID | O | | 9.2.yy | | YES | ignore |
| Cell Access mode | O | | 9.2.y.y | | YES | ignore |

TABLE 2

| Range bound | Explanation |
|---|---|
| maxnoofBPLMNs | Maximum no. of Broadcast PLMN Ids. Value is 6. |
| maxnoofMBSFN | Maximum no. of MBSFN frame allocation with different offset. Value is 8. |

In table 1, a cell access mode field indicates the cell access mode indicator.

The first eNB may perform an access control for a UE by determining whether the X2 interface between the first eNB and the second HeNB is available or not for the X2 handover based on the cell access mode of the second HeNB and/or membership information of the UE. In other words, when the first eNB supporting CSG (open mode, hybrid mode or closed mode) establishes X2 interface with the second HeNB supporting CSG (open mode, hybrid mode or closed mode), the cell access mode of the second HeNB and/or membership information of the UE can be used to determine whether the X2 interface is available or not for the X2 handover for solving the handover delay problem and/or the signaling impact problem on the core network. The present invention may be classified as described below according to the cell access mode of the second HeNB and/or membership information.

1) When the cell access mode of second HeNB is the open mode or hybrid mode, the X2 interface can be used for solving the problems. In this case, the first eNB may decide that the UE can handover to the second HeNB through the X2 interface.

2) When the cell access mode of second HeNB is closed mode, the X2 interface can also be used for solving the problems with the help of membership information of the UE. That is, if the UE is a member of second HeNB, the UE can handover to the second HeNB through the X2 interface.

3) When the cell access mode of second HeNB is closed mode and the UE is not a member of second HeNB, the X2 interface cannot be used. Thus the S1 handover should be done.

For the first eNB to perform UE access control efficiently, the first eNB needs to get UE information from the network (MME). Accordingly, the first eNB may receive the stored CSG subscription information for the UE from the network. The first eNB may use the received CSG subscription information for the UE to perform UE access control.

According to the present invention, the X2 interface may be used for the handover in the scenario of HeNBs with different CSG IDs. Or the X2 interface may be used for the handover in the scenario that the first eNB operates with the open mode or the first eNB is a macro eNB and the second HeNB operates with the hybrid mode or the closed mode. For example, if the second HeNB with CSG ID supports the hybrid mode, which is known by the first eNB, the first HeNB may transmit an X2 handover request message to the second HeNB directly in step S320 of FIG. 11. Accordingly, the handover delay problem and/or the signaling impact problem on the core network can be solved.

Meanwhile, the access control may be performed by a HeNB GW. If the access control is still performed by the MME in case of X2 handover, then the handover delay problem and/or the signaling impact problem on the core network may be hard to solve. Accordingly, the access control method performed by the HeNB GW may be proposed.

Figure 12:
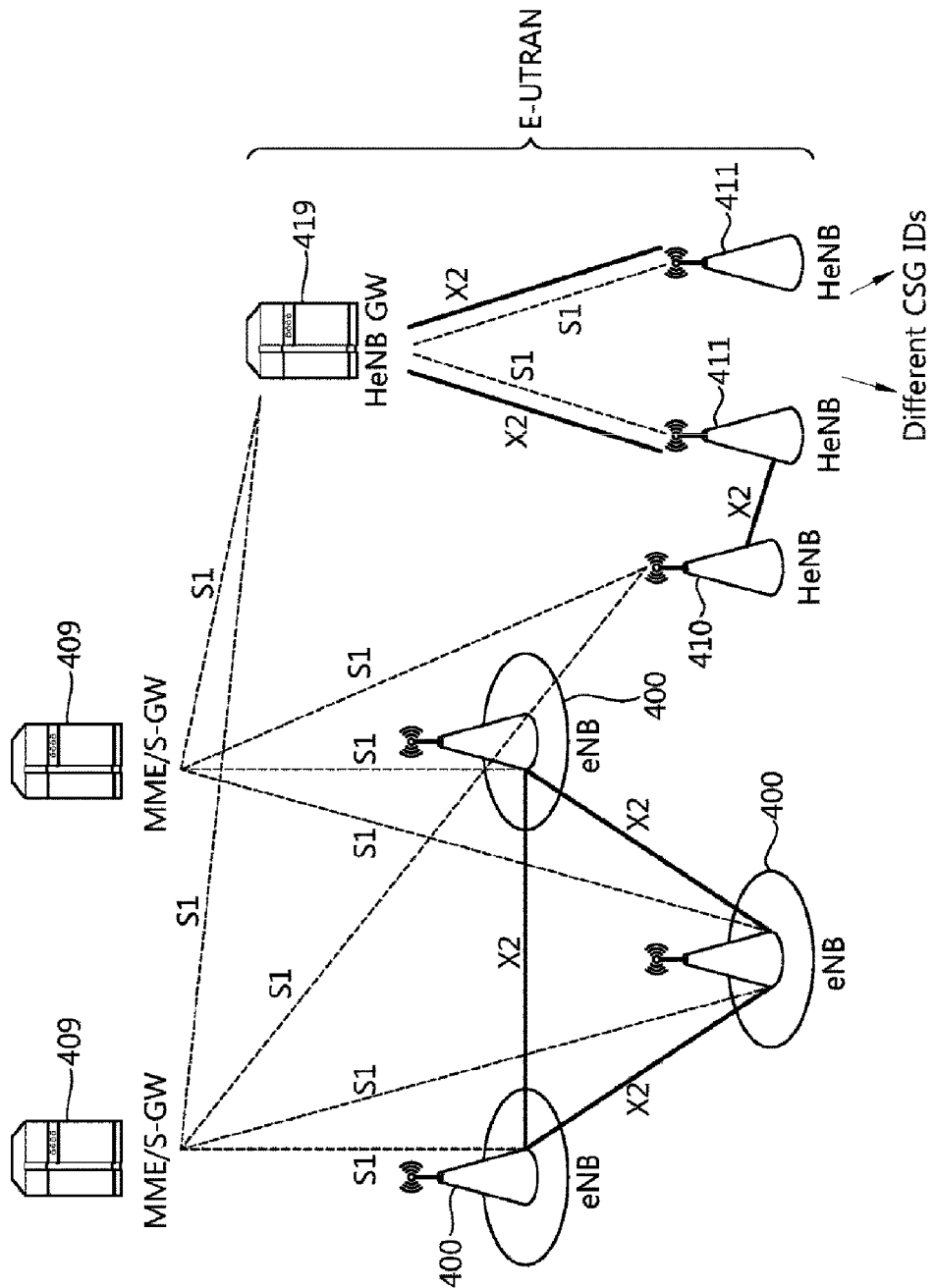
FIG. 12 shows another overall architecture with deployed HeNB GW according to the proposed invention.

FIG. 12 shows another overall architecture with deployed HeNB GW according to the proposed invention.

Referring to FIG. 12, an E-UTRAN may include one or more eNB 400, one or more HeNB 410, 411 and a HeNB GW 419. One or more E-UTRAN MME/S-GW 409 may be positioned at the end of the network and connected to an external network. The one or more eNB 400 may be connected to each other through the X2 interface. The one or more eNB 400 may be connected to the MME/S-GW 409 through the S1 interface. The HeNB GW 419 may be connected to the MME/S-GW 409 through the S1 interface. The HeNB GW 419 may perform access control for a UE. The one or more HeNB 410, 411 may be connected to the HeNB GW 419 through the S1 interface or may be connected to the MME/S-GW 409 through the S1 interface. Also, HeNBs 411 which have different CSG IDs may be connected through the X2 interface indirectly. That is, the X2 interface between the HeNBs 411 goes through the HeNB GW 419. Or, the HeNBs 411 may be connected to each other through the X2 interface indirectly if a source HeNB operates with the open mode and a target HeNB operates with the hybrid mode or the closed mode when an X2 handover is performed between the source HeNB and the target HeNB. In this case, the source HeNB may be replaced with a macro eNB When a first eNB supporting CSG establishes indirect X2 interface with a second HeNB supporting CSG, the first eNB transmits an X2 setup request message to a second HeNB or receives an X2 setup response message from the second HeNB. In case that the first eNB is a first HeNB, the first HeNB and the second HeNB operate with one of an open mode, a hybrid mode and a closed mode. Also, the first eNB and the second HeNB have different CSG IDs. Or, the first HeNB operates with the open mode and the second HeNB operates with the hybrid mode or the closed mode. Or, in case that the first eNB is a first macro eNB, the second HeNB operates with the hybrid mode or the closed mode.

The X2 setup request message or the X2 setup response message may include a cell access mode indicator which is indicating the cell access mode of the second HeNB. The cell access mode indicator may be added in a served cell information IE in the X2 setup request message and X2 setup response message. The served cell information IE contains cell configuration information of a cell that a neighbor eNB may need for the X2 interface. Table 1 and table 2 described above shows an example of the served cell information IE which adds the cell access mode indicator.

According to the present invention, the indirect X2 interface may be used for the handover in the scenario of HeNBs with different CSG IDs. Or the X2 interface may be used for the handover in the scenario that the first eNB operates with the open mode or the first eNB is a macro eNB and the second HeNB operates with the hybrid mode or the closed mode. For example, if the second HeNB with CSG ID supports the hybrid mode, which is known by the first eNB, the first eNB may transmit an X2 handover request message to the second HeNB indirectly. Accordingly, the handover delay problem and/or the signaling impact problem on the core network can be solved.

Also, when a first eNB supporting CSG establishes indirect X2 interface with a second HeNB supporting CSG, a cell access mode of the second HeNB and/or membership information of a UE can be used by a HeNB to determine whether the indirect X2 interface can be used for solving the handover delay problem and/or the signaling impact problem on the core network.

Figure 13:
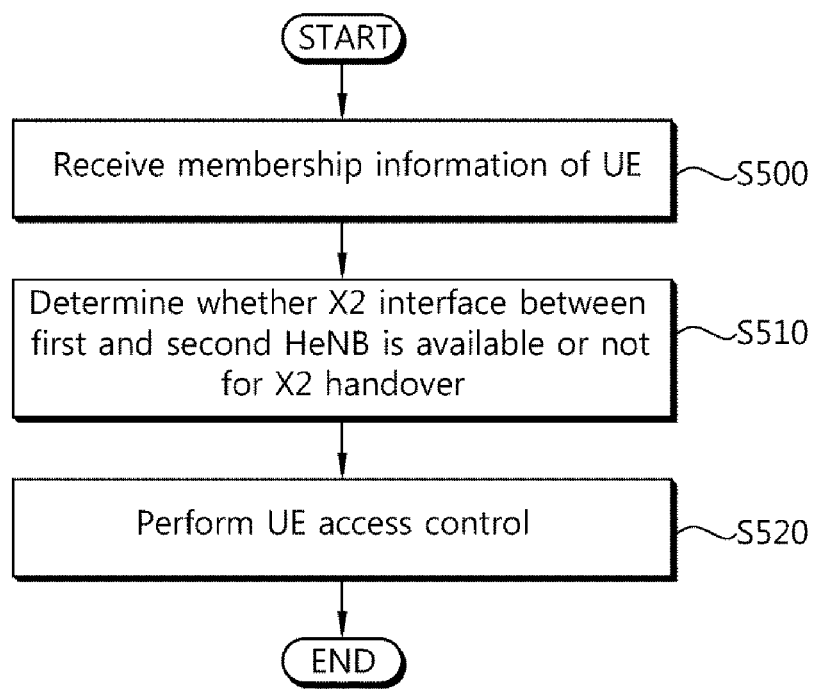
FIG. 13 shows the proposed access control method according to an embodiment of the present invention.

FIG. 13 shows the proposed access control method according to an embodiment of the present invention.

Referring to FIG. 13, a HeNB GW receives a cell access mode of the second HeNB and membership information of the UE in step S500. In step S510, the HeNB GW determines whether the X2 interface between the first eNB and the second HeNB is available or not for the X2 handover based on the cell access mode of the second HeNB. In step S520, the HeNB GW performs UE access control.

The UE may report the membership information to the first eNB based on the CSG ID received from the second HeNB and the UE's CSG whitelist. The first eNB forwards the membership information of the UE to HeNB GW.

When the cell access mode of second HeNB is the open mode or the hybrid mode, the X2 interface can be used for solving the problems. Or, when the cell access mode of second HeNB is the closed mode, the X2 interface can also be used for solving the problems with the help of the membership information of the UE. That is, if the UE is a member of second HeNB, the UE can handover to the second HeNB through the X2 interface.

The HeNB GW verifies the reported status of the UE by performing UE access control to the CSG cell based on the CSG ID received from the second HeNB and the stored CSG subscription information for the UE. If the access control procedure fails, the HeNB GW ends the handover procedure by replying with the failure message. If the cell access mode is the hybrid mode, the HeNB GW determines the CSG membership status of the UE handing over to the hybrid cell.

For the HeNB GW to perform UE access control efficiently, the HeNB GW needs to get UE information from the network (MME). Accordingly, the HeNB GW may receive the stored CSG subscription information for the UE from the network. The HeNB may use the received CSG subscription information for the UE to perform UE access control.

Figure 14:
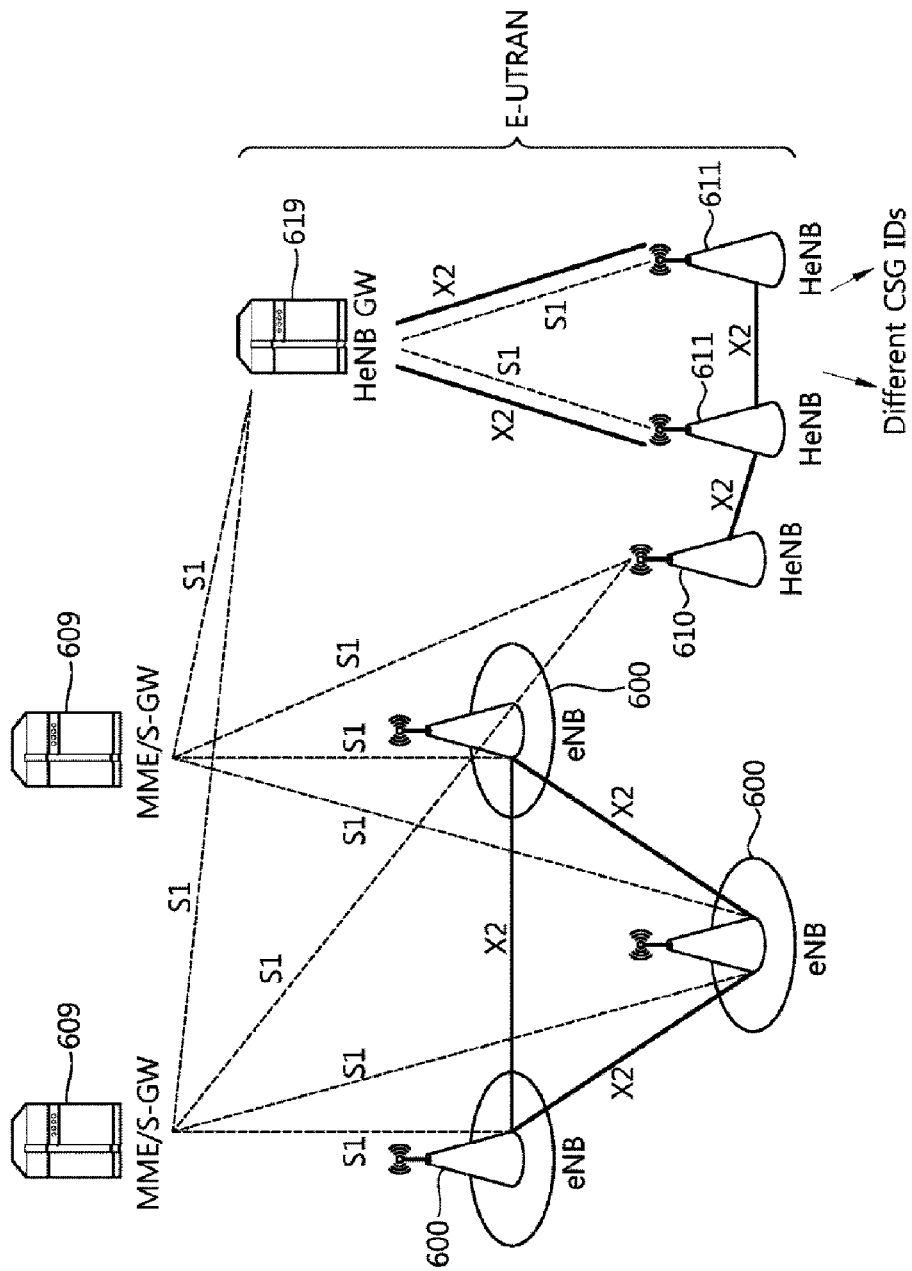
FIG. 14 shows another overall architecture with deployed HeNB GW according to the proposed invention.

FIG. 14 shows another overall architecture with deployed HeNB GW according to the proposed invention. The proposed invention described above may be applied to overall architecture in FIG. 14.

Referring to FIG. 14, an E-UTRAN may include one or more eNB 600, one or more HeNB 610, 611 and a HeNB GW 619. One or more E-UTRAN MME/S-GW 609 may be positioned at the end of the network and connected to an external network. The one or more eNB 600 may be connected to each other through the X2 interface. The one or more eNB 600 may be connected to the MME/S-GW 609 through the S1 interface. The HeNB GW 619 may be connected to the MME/S-GW 609 through the S1 interface. The HeNB GW 619 may perform access control for a UE. The one or more HeNB 610, 611 may be connected to the HeNB GW 619 through the S1 interface or may be connected to the MME/S-GW 609 through the S1 interface. Also, the HeNBs 611 which has different CSG IDs may be connected through the direct X2 interface and/or the indirect X2 interface. That is, both the direct X2 interface between HeNBs 611 and the indirect X2 interface going through HeNB GW 619 exist. In this case, the UE access control may be performed by the HeNB GW 619.

Figure 15:
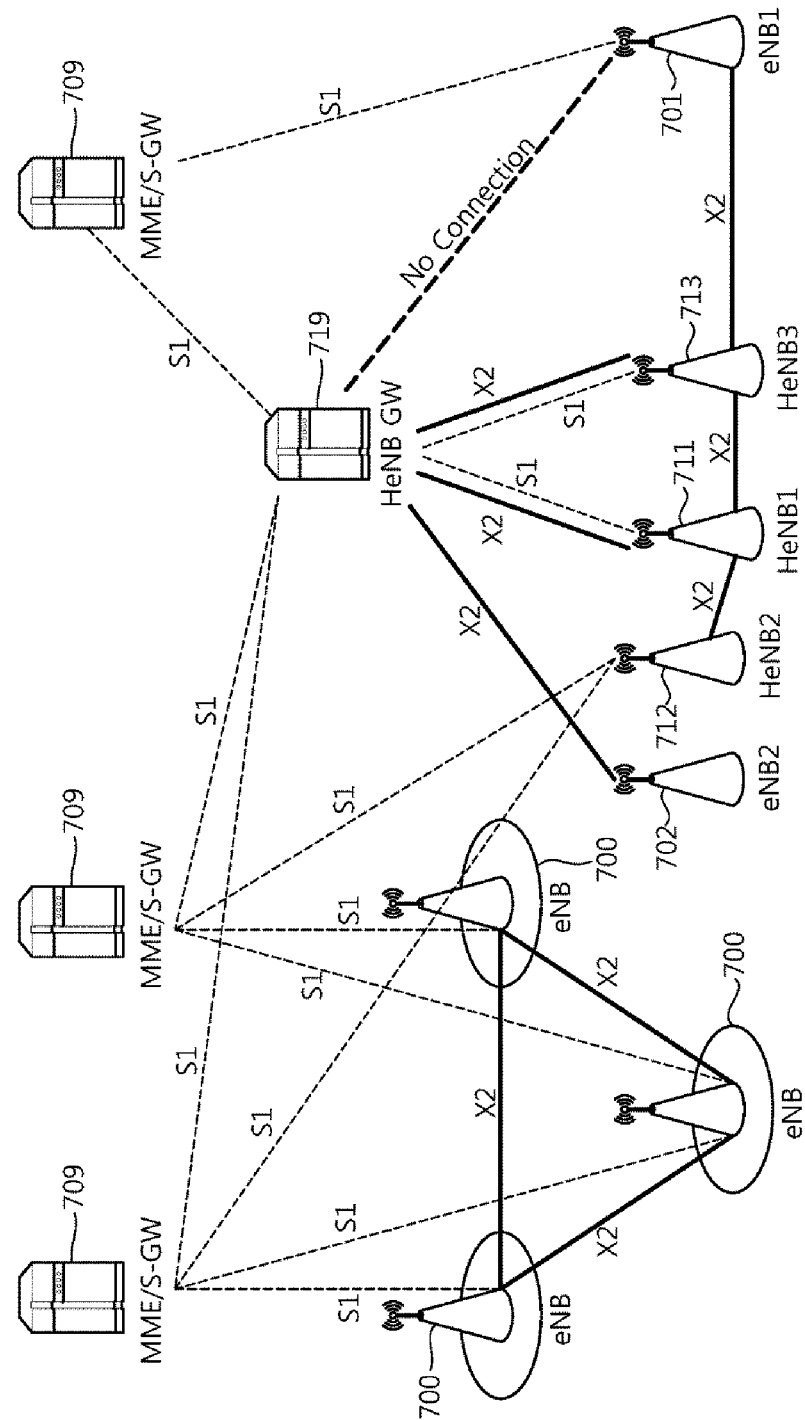
FIG. 15 shows another overall architecture with deployed HeNB GW according to the proposed invention.

FIG. 15 shows another overall architecture with deployed HeNB GW according to the proposed invention. The proposed invention described above may be applied to overall architecture in FIG. 15.

Referring to FIG. 15, an E-UTRAN may include one or more eNB 700, 701, 702, one or more HeNB 711, 712, 713 and a HeNB GW 719. One or more E-UTRAN MME/S-GW 709 may be positioned at the end of the network and connected to an external network. The one or more eNB 700 may be connected to each other through the X2 interface. The one or more eNB 700, 701 may be connected to the MME/S-GW 709 through the S1 interface. Or the eNB 702 may be connected to the HeNB GW 719 through the X2 interface. The HeNB GW 719 may be connected to the MME/S-GW 709 through the S1 interface. The HeNB GW 719 may perform access control for a UE. The one or more HeNB 711, 713 may be connected to the HeNB GW 719 through the S1 interface. Or the HeNB 712 may be connected to the MME/S-GW 709 through the S1 interface. The HeNBs 711, 713 may be connected through the direct X2 interface and/or the indirect X2 interface. That is, both the direct X2 interface between HeNBs 711, 713 and the indirect X2 interface going through HeNB GW 619 exist. Also, the eNB1 701 and the HeNB3 713 may be connected to each other through the direct X2 interface.

In this case, the UE access control may be performed by the HeNB GW 719. When a macro eNB establishes direct X2 interface with a HeNB supporting CSG, the HeNB transmits an X2 setup request message to the macro eNB or an X2 setup response message to the macro eNB. The HeNB operates with one of an open mode, a hybrid mode and a closed mode.

Figure 16:
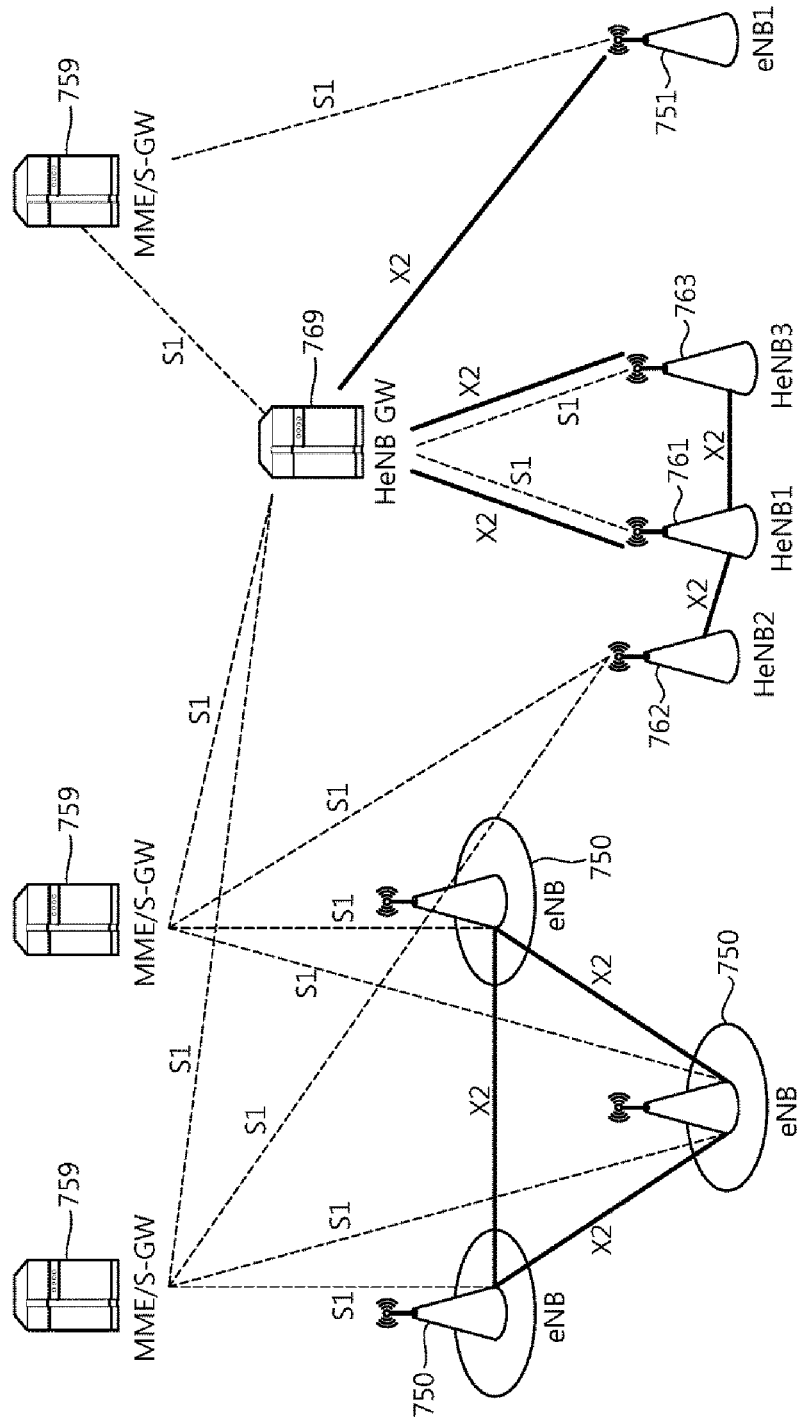
FIG. 16 shows another overall architecture with deployed HeNB GW according to the proposed invention.

FIG. 16 shows another overall architecture with deployed HeNB GW according to the proposed invention. The proposed invention described above may be applied to overall architecture in FIG. 16.

Referring to FIG. 16, an E-UTRAN may include one or more eNB 750, 751, one or more HeNB 761, 762, 763 and a HeNB GW 769. One or more E-UTRAN MME/S-GW 759 may be positioned at the end of the network and connected to an external network. The one or more eNB 750 may be connected to each other through the X2 interface. The one or more eNB 750, 751 may be connected to the MME/S-GW 759 through the S1 interface. The HeNB GW 769 may be connected to the MME/S-GW 759 through the S1 interface. The HeNB GW 769 may perform access control for a UE. The one or more HeNB 761, 763 may be connected to the HeNB GW 769 through the S1 interface. Or the HeNB 762 may be connected to the MME/S-GW 759 through the S1 interface. The HeNBs 761, 763 may be connected through the direct X2 interface and/or the indirect X2 interface. That is, both the direct X2 interface between HeNBs 761, 763 and the indirect X2 interface going through HeNB GW 769 exist. Also, the eNB1 751 and the HeNB3 763 may be connected to each other through the indirect X2 interface going through the HeNB GW 769.

In this case, the UE access control may be performed by the HeNB GW 769. When a macro eNB establishes indirect X2 interface with a HeNB supporting CSG, the HeNB transmits an X2 setup request message to the macro eNB or an X2 setup response message to the macro eNB. The HeNB operates with one of an open mode, a hybrid mode and a closed mode.

In FIG. 15 and FIG. 16, the X2 setup request message or the X2 setup response message may go through the HeNB GW or may not depend on whether it is direct X2 interface or indirect X2 interface.

Figure 17:
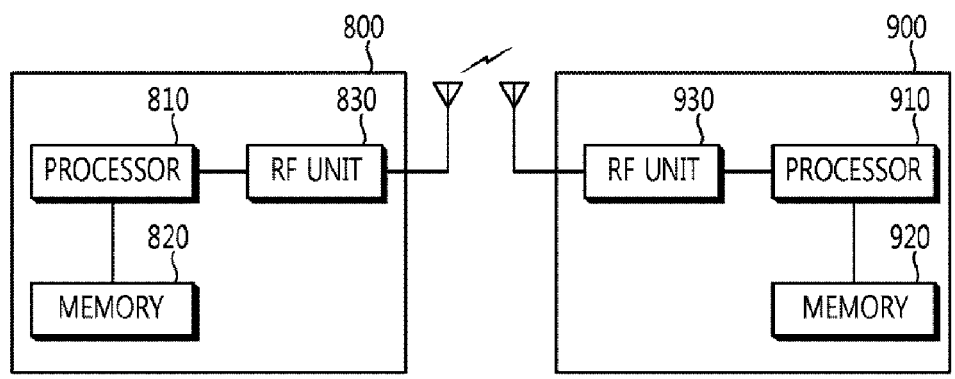
FIG. 17 is a block diagram showing wireless communication system to implement an embodiment of the present invention.

FIG. 17 is a block diagram showing wireless communication system to implement an embodiment of the present invention.

A first device 800 includes a processor 810, a memory 820, and an RF (Radio Frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of performing an X2 interface setup in a wireless communication system, the method comprising:
   transmitting, by a first home evolved NodeB (HeNB), an X2 setup request message to a second HeNB via an HeNB gateway (GW), the X2 setup request message including a first cell access mode indicator indicating a cell access mode of the first HeNB;
   receiving, by the first HeNB, an X2 setup response message from the second HeNB via the HeNB GW, the X2 setup response message including a second cell access mode indicator indicating a cell access mode of the second HeNB;
   determining, by the first HeNB, whether an X2 interface between the first HeNB and the second HeNB is available or not for an X2 handover based on the cell access mode of the second HeNB; and
   transmitting, by the first HeNB, an X2 handover request message to the second HeNB when the X2 interface is available,
   wherein the first HeNB and the second HeNB operate with one of an open mode, a hybrid mod, and a closed mode, the open mode indicating that an HeNB provides services to any user equipments (UEs), the hybrid mode indicating that a closed subscriber group (CSG) cell provides services to its associated CSG member UEs and to non-CSG member UEs, the closed mode indicating that a CSG cell provides services only to its associated CSG member UEs, and
   wherein each of the first HeNB and the second HeNB has a different closed subscriber group (CSG) identifier (ID).

2. The method of claim 1, wherein the X2 interface is available for the X2 handover when the second cell access mode indicator indicates that the cell access mode of the second HeNB is the open mode or the hybrid mode.

3. The method of claim 2, wherein the X2 interface is available for the X2 handover when the second cell access mode indicator indicates that the cell access mode of the second HeNB is the closed mode and a UE is a member of the second HeNB, the UE intending to handover to the second HeNB.

4. A method of performing access control by a home evolved NodeB (HeNB) gateway (GW) in a wireless communication system, the method comprising:
   receiving a cell access mode of a target HeNB and membership information of a user equipment (UE);
   receiving stored closed subscriber group (CSG) subscription information for the UE from a mobility management entity (MME);
   determining whether an X2 interface between a source eNB and the target HeNB is available or not for an X2 handover based on the cell access mode of the target HeNB, the membership information, and the stored CSG subscription information for the UE; and
   performing UE access control via the X2 interface when the X2 interface is available for the X2 handover,
   wherein the membership information is determined based on a CSG identifier (ID) received from the target eNB and the UE's CSG whitelist.

5. The method of claim 4, wherein the X2 interface is available for the X2 handover when the cell access mode of the target HeNB is a open mode or a hybrid mode.

6. The method of claim 4, wherein a direct X2 interface is available for the X2 handover when the cell access mode of the target HeNB is a closed mode and the UE is a member of the target HeNB, the UE intending to handover to the target HeNB.

* * * * *